United States Patent

Defoor et al.

[11] Patent Number: 6,025,418
[45] Date of Patent: Feb. 15, 2000

[54] PROCESS FOR PREPARING BITUMEN/RUBBER COMPOSITIONS

[75] Inventors: Frans Maurice Joseph Defoor, Strombeek-Bever; Jean-Philippe Hallet, Bruxelles; Thierry Christian Coupin, Carnieres, all of Belgium

[73] Assignee: Fina Research, S.A., Feluy, Belgium

[21] Appl. No.: 08/800,141

[22] Filed: Feb. 13, 1997

Related U.S. Application Data

[63] Continuation of application No. 07/884,858, May 11, 1992, abandoned, which is a continuation of application No. 07/474,824, Jul. 30, 1990, abandoned.

[30] Foreign Application Priority Data

Jun. 9, 1989 [WO] WIPO ............... PCT/BE89/00026

[51] Int. Cl.$^7$ ........................................... C08L 9/06
[52] U.S. Cl. ................................. 524/71; 524/59
[58] Field of Search .................. 524/69, 59, 71

[56] References Cited

U.S. PATENT DOCUMENTS 3,963,659 6/1976 Binder et al. .
5,508,112 4/1996 Planche et al. .

*Primary Examiner*—Robert Dawson
*Assistant Examiner*—D. Aylward
*Attorney, Agent, or Firm*—Michael J. Caddell; William D. Jackson; M. Norwood Cheairs

[57] ABSTRACT

An elastomer is blended with bitumen, an alkaline compound is then added which is soluble in the bitumen, and to this mixture is added 0.01 to 0.1% by weight of a mixture of vulcanizing agents comprising elemental sulphur and a sulphur-containing derivative of the form:

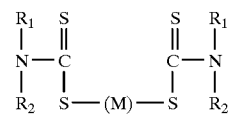

where $R_1$ and $R_2$ are $C_1$ to $C_4$ alkyl radicals or, together $R_1$ and $R_2$ have the formula

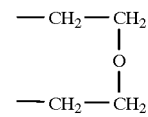

and where M, which is optional, is Zn, Ba or Cu.

9 Claims, No Drawings

PROCESS FOR PREPARING BITUMEN/RUBBER COMPOSITIONS

CROSS REFERENCES TO RELATED APPLICATIONS

This application is a continuation of a prior U.S. application, filed May 11, 1992, Ser. No. 07/884,858, now abandoned; which is a continuation of prior U.S. application, filed Jul. 30, 1990, Ser. No. 07/474,824, now abandoned; which application claims priority of PCT application, Ser. No. PCT/BE89/00026, filed Jun. 9, 1989; and priority of Belgian application, Serial No. BE 8800660, file Jun. 10, 1988, all of which have the same title and inventors.

FIELD OF THE INVENTION

The present invention is related to hydrocarbon-based binders, such as bitumens, asphalts and tars, modified with elastomers, and including a vulcanized stage, which are particularly useful as industrial coatings and road bitumens, or the like. It relates more especially to a process for obtaining vulcanized compositions based on bitumens and on styrene/butadiene copolymers.

BACKGROUND OF THE INVENTION

It has long been known to incorporate various elastomers such as block copolymers, sequenced or otherwise, of the conjugated diene/vinylaromatic type and most often block copolymers such as styrene/butadiene/styrene di-blocks, into bitumens, in order to improve their mechanical properties and to satisfy the standards established for use as binders. With vulcanization, products are obtained which retain their elastic characteristics, even at low temperatures However, the production of such bitumen/polymer mixtures causes problems relating to their homogeneity and to the very long malaxation time needed for obtaining the appropriate homogeneity. For example, even under the most favorable conditions known to date, the mixtures must be kept stirred for at least two hours, and most often three to four hours, at a temperature on the order of 150–190C., in order to achieve correct homogeneity of the bitumen/polymer mixture before the vulcanizing agent is added.

Thus, the bitumen/rubber compositions of the prior art were difficult to use, and had poor properties of cohesion and very poor resistance to cracking.

In addition, in the prior processes, elemental sulphur is used as a vulcanizing agent. With elemental sulphur, the vulcanization reaction is very rapid and uncontrollable and, more often than not, an unusable gel is produced.

In order to remedy some of these disadvantages, it has been proposed to mix the rubber with a petroleum cut to incorporate it more rapidly into the bitumen. However, it was found that during the evaporation of this petroleum cut, the final product had a low resistance to cracking due to a lack of elasticity.

The present invention relates to a process for preparing bitumen/polymer compositions having improved properties, including improved resistance to cracking and higher elasticity.

One object of the present invention is to provide a process for preparing bitumen/polymer compositions in the presence of novel vulcanizing agents, in order to achieve better control of the vulcanization reaction.

Another object of the invention is to provide a process for preparing bitumen/polymer compositions which does not necessitate the incorporation of a petroleum cut.

SUMMARY OF THE INVENTION

The process of the present invention for the preparation of bitumen/polymer compositions having improved properties comprises the steps of:

(i) bringing a bitumen having a penetration of between 20 and 320 and an elastomeric polymer into mixing contact at a temperature of between 140° and 180° C., the said elastomeric polymer being a styrene/conjugated diene block copolymer comprising from 1 to 20% by weight of the bitumen/polymer mixture;

(ii) as soon as the polymer is incorporated into the bitumen, introducing into the mixture from 0.01 to 0.10% by weight, based on the weight of the bitumen/polymer mixture, vulcanizing agents comprising (a) a sulphur-containing derivative selected from the group of derivatives having the formulae I and II:

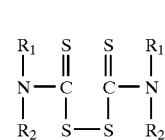

(I)

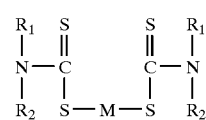

(II)

in which $R_1$ and $R_2$ are like or different alkyl radicals having from 1 to 4 carbon atoms, or, combined together, form a radical having the formula

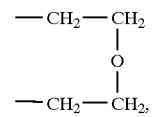

and
wherein M is a metal selected from zinc, barium or copper, and (b) elemental sulphur, such that the sulphur-containing derivative: elemental sulphur ratio is between 20:80 and 80:20; and (iii) introducing into the bitumen/polymer mixture, simultaneously with the vulcanizing agents, an alkaline compound which is soluble in the bitumen.

DETAILED DESCRIPTION OF THE PREFERRED EMBODIMENTS

Applicants have found unexpectedly that by using the vulcanizing agent of the present invention, it is possible to control the reaction much better. In addition, the joint use of this vulcanization system and an alkaline compound makes it possible to prepare bituminous binders having markedly improved resistance to cracking.

In preparing the modified binder according to the present invention, it is possible to use all ordinary bitumen whose penetration is between 20 and 320. Penetration is defined in the art as the distance in tenths of millimeter that a standard needle vertically penetrates a bitumen sample at 25° C. under a load of 100 g in 5 seconds (ASTM D5).

According to the process of the invention, an elastomeric polymer selected from styrene/conjugated diene block copolymers is incorporated into the bitumen. For the elastomeric block copolymers, it is possible to utilize linear, radial or multi-branched block copolymers of the styrene/butadiene or styrene/isoprene type having a weight average molecular weight of between 30,000 and 300,000, (unless stated otherwise, all references herein to molecular weight refer to weight average molecular weight) depending on whether or not a bi- or polyfunctional coupling agent is used. It is also possible to use in the process of the invention linear block copolymers prepared without a coupling agent. In one preferred embodiment of the invention, a linear or branched block copolymer of the styrene/butadiene type is used.

Incorporation of the elastomeric polymer into the bitumen is carried out for a period of 1 to 4 hours depending on the type of agitator used, on molecular weight of the polymer, on the penetration index of the bitumen and on the temperature at which the incorporation is carried out.

The amount of elastomeric polymer which is introduced into the bitumen also depends upon the application for which the product is intended. In general, from 1 to 20% by weight of elastomeric polymer is introduced, but preferably from 4 to 10% by weight thereof is most often introduced, based on the weight of the bitumen/elastomeric polymer mixture.

Applicants have also found that the vulcanizing agent system is very important. In fact, it has been found that, unexpectedly, the many disadvantages mentioned above could be eliminated by combining elemental sulphur and a sulphur-containing derivative selected from the derivatives whose formula is

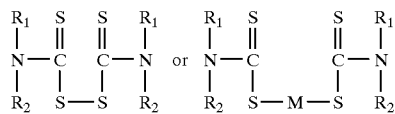

in which $R_1$ and $R_2$ are like or different alkyl radicals having from 1 to 4 carbon atoms, or, combined together, form a radical having the formula

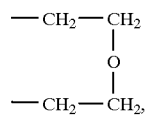

and wherein M is a metal chosen from zinc, barium or copper.

It was found that the ratio, by weight, of the elemental sulphur to the sulphur-containing derivative should be between 20:80 and 80:20, and preferably between 40:60 and 60:40.

Applicants have also found that the alkaline compound dissolved in the bitumen is essential for carrying out the process of the invention, apparently irrespective of the bitumen used.

In general, the alkaline compound is chosen from amino derivatives such as diethanolamine or diethylene-triamine or triethanolamine. However, other alkaline compounds can also be advantageously used. The appropriate amount of alkaline compound to be introduced is between about 0.05 and about 1% by weight, based on the weight of bitumen/polymer mixture. It was noted that an absence of the alkaline compound in the composition resulted in a definite lacking of these desirable characteristics:

(a) a controllable rate of reaction, and
(b) an appropriate degree of crosslinking.

Although many processes mention the use of a vulcanization accelerator, it is no longer necessary to use one with the composition of the present invention. It is also unnecessary while practicing this invention to add a petroleum oil in order to promote the incorporation of the ingredients into the bitumen, but it is nevertheless possible to use one without departing from the scope of the present invention. The oil may be added before or after the vulcanization reaction.

According to one embodiment of the present invention, the appropriate amount of elastomeric polymer is incorporated into the bitumen, this being done usually at a temperature between 140° and 180° C. in order to avoid excessive degradation of the elastomeric polymer. The incorporation time depends primarily on the agitation system used and the working temperature, but also on the form in which the elastomeric polymer is introduced. For example, the polymer can be added in the form of compact granules or in the form of highly porous blocks which dissolve more readily.

Thus, when the incorporation of the elastomeric polymer into the bitumen has taken place, the total amount of vulcanizing agent and of alkaline compound is then introduced into the mixture at the same temperature as that at which the elastomeric polymer has been dissolved. Reaction is allowed to take place for 100 to 150 minutes at this temperature, and the completed binder is then dispatched to be stored or for immediate use.

It was discovered by Applicant that the binders of the present invention retained better elasticity at low temperatures than those of the prior art and, in addition, achieved better cohesion with the aggregates used in road surfacing.

In using the present invention, it is possible to carry out road surfacing by hot distribution of the binders, or alternatively, by distribution of the binder in the form of an aqueous emulsion of bituminous composition.

In general, to prepare an emulsion of this binder, a portion of the total amount of emulsifier is mixed into the binder, and then this mixture is emulsified in an aqueous phase containing the remainder of the emulsifier and a sufficient amount of acid to neutralize the emulsifier. It is understood that the total amount of emulsifier can also be introduced initially into the aqueous phase.

The present invention is illustrated by the following examples that are not limiting.

EXAMPLE 1

A binder was prepared by mixing, for 90 minutes at 160° C., 96 parts of a bitumen having a penetration of 180/200 with 4 parts of a radial-structured block copolymer of the styrene/butadiene type having a molecular weight of 180,000 and in which the proportion of styrene is 20%, used in the form of porous granules.

0.1 part of a mixture comprising equal amounts of elemental sulphur and sulphur-containing derivative of formula

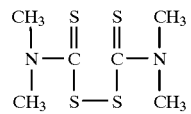

was also injected.

0.2 part of triethanolamine was also added to this mixture. (All references herein to "parts" refer to parts by weight unless stated otherwise).

After a period of 90 minutes to 2 hours, a homogeneous mixture was obtained, the properties of which are shown in the table below. The measurements of elongation and of breaking stress were carried out following ASTM method D-412.

TABLE

| Malaxation time | 0 hr | 3 hr |
|---|---|---|
| Viscosity at 135° C. (cp) | 765 | 1008 |
| Elongation (%) (measurement at 25° C.) | 2400 | 5200 |
| Tensile strength at break (MPa) | 0.052 | 0.120 |
| Elongation (%) (measured at −5° C.) | 600 | 2200 |

By way of comparison, the same binder was prepared, also containing diethanolamine but using only elemental sulphur (in the proportion of 0.1 part) as the vulcanizing agent.
The following results were obtained:

| Malaxation time | 0 hr | 3 hr |
|---|---|---|
| Viscosity at 135° C. (cp) | 750 | 1900 |
| Tensile strength at break (MPa) | 0.052 | 0.150 |
| Elongation (%) | | |
| at 25° C. | 2200 | 1500 |
| at −5° C. | 600 | 900 |

In addition, the presence of a substantial amount of gel was noted.

EXAMPLE 2

A binder was prepared by mixing, at 170° C., 87.9 parts of a bitumen having a penetration of 180/200 with 12 parts of a radial-structured block copolymer of the styrene/butadiene type having a molecular weight of 160,000 and in which the proportion of styrene is 30%.

This binder was prepared at a temperature of 170° C.

0.15 part of a mixture comprising 60% of the sulphur-containing derivative having the formula

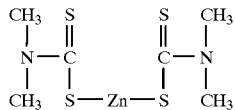

and 40% of elemental sulphur was also injected.

0.2 part of triethanolamine was also added to this mixture.

After a period of between 2 and 3 hours, a homogeneous mixture was obtained, the properties of which were as follows:

| Viscosity at 180° C. (cp) | 1500 |
|---|---|
| Tensile strength at break (MPa) | 0.076 |
| Elongation (%) | |
| at 25° C. | 2500 |
| at −5° C. | 1400 |

The same mixture minus the sulphur-containing derivative and having 0.3 part of elemental sulphur as the sole vulcanizing agent had an elongation at −5° C. of only 300%.

EXAMPLE 3

The binder described in Example 1 was prepared by mixing the components in the following proportions:

a. 8500 kg of bitumen of penetration 180/200
b. 436 kg of a butadiene /styrene copolymer of molecular weight 180,000 and having a styrene content of 20%
c. 7.5 kg of a 50:50 mixture of elemental sulphur and sulphur-containing derivative of formula

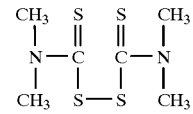

d. 24 kg of an emulsifier comprising a hydrogenated tallow diamine and a hydrogenated tallow polyamine.

An aqueous phase comprising the following was prepared:
a. 31 L of concentrated HCl (concentration approx. 37%)
b. 17 L of the emulsifying system containing 24 kg of the emulsifier listed in (d) above in water
c. 50 L of tar oil
d. 2900 L of water The two phases were emulsified in a bitumen/water ratio of 70:30 by weight.

This emulsion spreads easily at 70° C. The breaking of the emulsion occurs after approximately 30 minutes.

A sample of emulsion was taken, the water was removed and the elongation was measured on this sample. Water can be removed by extraction with isopropanol or by heating at 80° C.

The elongation at 25° C. was 2700%, while that at −5° C. was 1400%.

In the following claims, % compositions always refer to % by weight unless stated to the contrary.

What is claimed is:

1. A process for preparing bitumen/polymer compositions having improved properties, characterized in that it comprises the steps of:

(i) bringing a bitumen of penetration between 20 and 320 and an elastomeric polymer into mixing contact at a temperature of between 140 and 180° C., the said elastomeric polymer being a styrene/conjugated diene block copolymer comprising from 1 to 20% by weight of the bitumen/polymer mixture;

(ii) as soon as the elastomeric polymer is incorporated into the bitumen, introducing into the mixture from 0.01 to 0.1% by weight, based on the weight of the bitumen/elastomeric polymer mixture, vulcanizing agents comprising (a) a sulphur-containing derivative selected from the group of derivatives having the formulae I and II

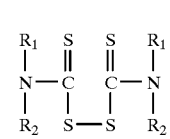

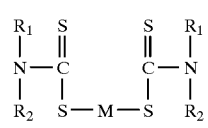

in which $R_1$ and $R_2$ are like or different alkyl radicals having from 1 to 4 carbon atoms, or, combined together, form a radical having the formula

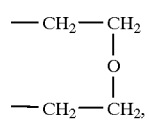

and wherein M is a metal selected from zinc, barium or copper, and (b) elemental sulphur, such that the sulphur-containing derivative: elemental sulphur ratio is between 20:80 and 80:20;

and (iii) introducing into the bitumen/elastomeric polymer mixture, simultaneously with the vulcanizing agents, an alkaline compound which is soluble in the bitumen.

2. The process of claim 1, characterized in that the sulphur-containing derivative is selected from the group of derivatives having the formulae:

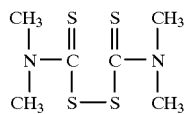

and

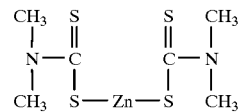

3. The process of claim 1, characterized in that the used elastomeric polymer has a weight average molecular weight of between 30,000 and 300,000.

4. The process of claim 1, 2 or 3, characterized in that the elastomeric polymer is introduced into the bitumen in the proportion of 4 to 10% by weight, based on the weight of the bitumen/elastomeric polymer mixture.

5. The process of claim 1, characterized in that said alkaline compound is used in a proportion of about 0.05% to about 1% by weight, based on the weight of the bitumen/elastomeric polymer mixture.

6. The process of claim 5, characterized in that said alkaline compound is an amino derivative.

7. The process of claim 1, characterized in that the vulcanizing agents and the alkaline compound are introduced at the same temperature as that at which the elastomeric polymer has been dissolved in the bitumen.

8. The process of claim 6, wherein said amino derivative is diethanolamine, triethanolamine, diethylenetriamine, or mixtures thereof.

9. Compositions obtained by the process of claims 1–3 or 5–8.

* * * * *

UNITED STATES PATENT AND TRADEMARK OFFICE
CERTIFICATE OF CORRECTION

PATENT NO : 6,025,418
DATED : February 15, 2000
INVENTOR(S) : Fran Maurice Joseph Defoor et al.

It is certified that error appears in the above-identified patent and that said Letters Patent is hereby corrected as shown below:

On title page, item 30 Foreign Application Priority Data
please add
--Jun.10, 1988 [BE] Belgium Application No. 8800660--.

Signed and Sealed this

Thirteenth Day of February, 2001

NICHOLAS P. GODICI

Attest:

Attesting Officer

Acting Director of the United States Patent and Trademark Office